Feb. 24, 1959     O. F. HEVENER     2,874,571
WEATHER INDICATOR

Filed Jan. 22, 1953     2 Sheets-Sheet 1

INVENTOR
Osborn Fort Hevener
BY
William F. Sickel
ATTORNEY

Feb. 24, 1959  O. F. HEVENER  2,874,571
WEATHER INDICATOR
Filed Jan. 22, 1953  2 Sheets-Sheet 2
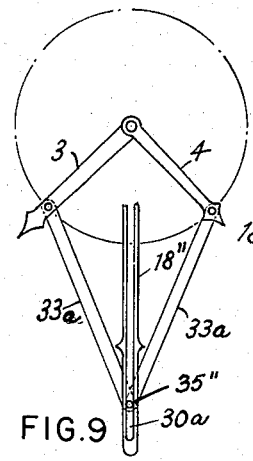
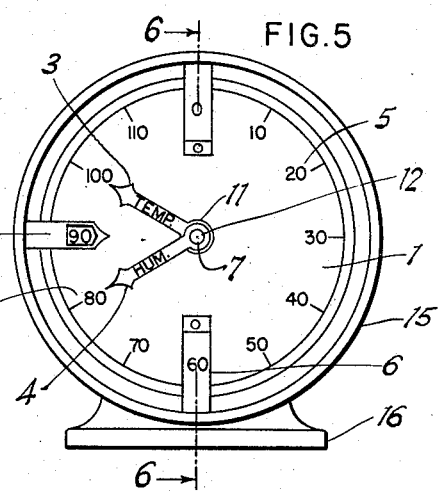
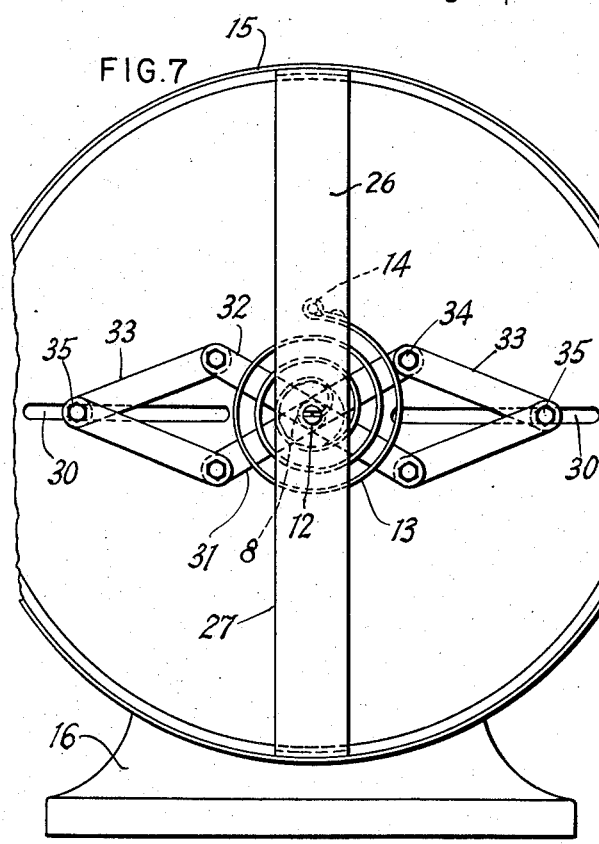
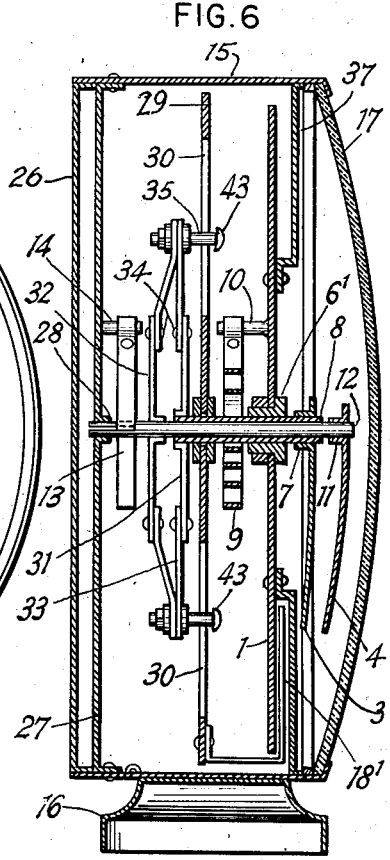
INVENTOR.
Osborn Fort Hevener
BY
William F. Nickel
ATTORNEY

# United States Patent Office 2,874,571
Patented Feb. 24, 1959

2,874,571

WEATHER INDICATOR

Osborn Fort Hevener, Maplewood, N. J.

Application January 22, 1953, Serial No. 332,687

4 Claims. (Cl. 73—336)

This invention is an improved instrument calculated to indicate factors associated with prevailing conditions of weather; and particularly the temperature and humidity, and the effect of the latter in connection with the actual temperature in the locality where the instrument is put into use.

The principal object of the invention is to provide an indicator which is exceedingly simple in construction and most efficient in operation; and having a scale which is capable of showing temperature and humidity and the resultant of these two, with the utmost clearness and in a manner with which virtually every one is familiar; and which is therefore extremely easy to read and understand.

Another object of the invention is to provide an instrument adapted to answer the purpose mentioned and designed so that a single scale with but one set of calibrations or graduations and a single set of characters serves to show the degree of temperature and the percentage of humidity existing at the time and place of inspection; by means of a pair of movable index members or pointers; one of which is responsive to changes in heat and the other to changes in the moisture content of the atmosphere; the two acting in unison, and the instrument includes a third member operable with reference to the same scale, so that the positions of said members with respect to the characters on the scale will at once reveal to the observer all the information which the instrument is intended to convey.

The general public is now well aware of the importance of humidity as well as temperature in all that is conducive to human comfort; and both humidity indicators and temperature indicators or thermometers are widely employed. But heretofore such instruments have either been produced as either separate units or appliances with separate scales and graduations and separate index pointers for temperature and humidity to only give the readings for each. In the preferred form of my invention, only one scale with suitable graduations is employed; and the three index members are independently movable and cooperate with the characters on the face of the single scale to give the final readings desired.

The third member can be made to show the arithmetical mean of the numbers to which the humidity and temperature members point, and this is the ultimate reading which the instrument is adapted to present.

To this end I take advantage of the fact that both temperature and humidity are determined and measured by virtually the same numbers. Temperature is denoted by numbers extending from zero or below to 100 or more above zero; and humidity is indicated by the same range of numerical characters from zero to 100 percent which is the saturation point. Therefore I need take but one set of numbers and arrange these upon the face of a suitable dial, over which the two index members are moved in accordance with changes in the heat and moisture which the air contains, the third member being adjustable according to the positions of the other two.

I further take advantage of the fact that virtually every person from a very early age becomes familiar with the face of an ordinary clock and learns what the motion of the two hands over the numbers means with reference to the time of the day. In my invention the form of the scale is similar to the arrangement of the graduations indicating hours and minutes for a clock and the index pointers for temperature and humidity are like the hands of a clock and turn in the same way, but can also automatically move backward. The position of one member at any given instant makes known the humidity and the position of the other the temperature. Both factors are thus infallibly set forth to the eye on the same scale, and when the third or additional member receives its corresponding position any person, whether scientifically minded or not, can be made fully cognizant of the exact state of the atmosphere, with no difficulty and all chance of error or mistake is completely obviated.

A further object is to provide an instrument by which the third member is automatically actuated in unison with the other members.

The structure of the appliance is amply described in the following specification and the novel features are pointed out in the claims. But the drawings illustrate only the best forms of the invention now known to me and I may make changes in details without material deviation from the general plan or combination in which the invention resides.

On the drawings:

Figure 5 is a front view of another embodiment of the invention;

Figure 6 is a rear view thereof;

Figure 7 is a vertical section on line 6—6 in Figure 5;

Figure 9 indicates a further modification.

Figure 1:
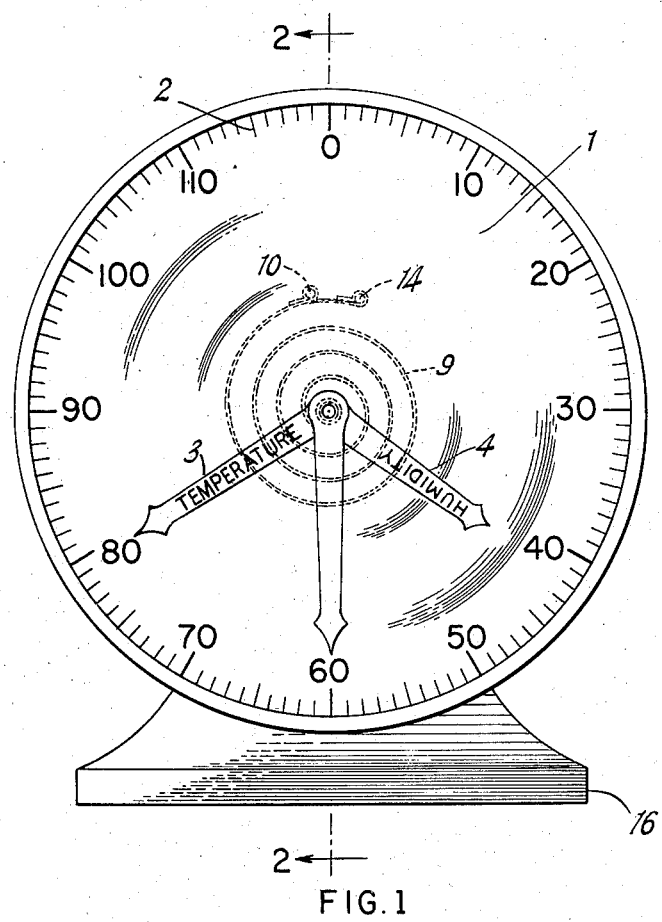
Figure 1 shows in front elevation one form of instrument according to my invention.
Figure 2:
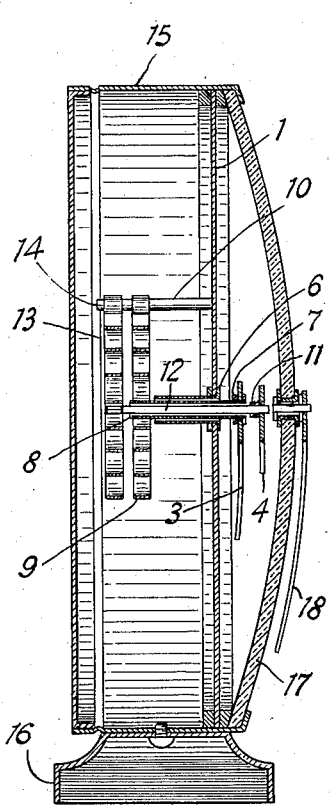
Figure 2 is a central vertical section on line 2—2 of Figure 1.
Figures 3, 4:
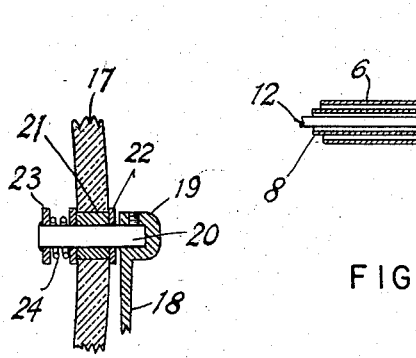
Figure 3 is an enlarged detail showing how the index members are mounted.
Figure 4 shows a similar detail of a preferred mounting for the index members for indicating temperature and humidity.

On Figures 1, 2, 3 and 4 the instrument is shown as comprising a plate 1 which is preferably circular in shape like the dial or face of an ordinary time clock; and on the surface of this plate is a single scale 2 having graduations adjacent the outer edge, curved to lie parallel thereto and extending substantially around the entire circumference of the plate. Cooperating with the scale 2 are the index members 3 and 4, which are like the hands of the clock, and are mounted to revolve about a common axis at the center of the fixed plate 1 and scale 2, and thus move along the scale. The index member 3, for example, points to the degree of temperature; and the other pointer 4 shows the degree or percentage of humidity.

The graduations 5 of the scale run from zero to one hundred and over, and the numbers associated with the graduations beyond the zero mark, which is at the top, are 10 and multiples thereof. Hence the same numbers can give readings for both the temperature and percentage of moisture in the air, according to the position of the hands 3 and 4. The latter are made so that the function of each is apparent at a mere glance. Each may have a distinctive form and color, such as red for temperature, and for humidity green or white, or bear the appropriate names. The scale may include graduations below zero if desired.

To mount the hands 3 and 4 the plate 1 has a hollow sleeve or bushing forming a bearing 6 fixed in an opening at the center and the temperature pointer 3 has a hub 7 affixed to a tubular shaft 8 in the bearing 6. On the opposite face of the dial is a heat responsive coil 9, one end of which is affixed to the shaft 8; and the other is properly anchored to a stationary pin or other element 10 on the rear or inner face of the plate 1. The hand 4 also has a hub 11 affixed to the end of a shaft or arbor 12 which is enveloped by the tubular shaft 8, the rear end of the shaft 12 projecting out of the rear end of the shaft 8. This end is secured in any suitable fashion to the one extremity of a coil 13 made of a material affected by moisture, and having its opposite or outer extremity anchored to the plate 1 by means of a pin or stud or other element 14 thereon. The two coils can be secured to one pin if preferred. The hands 3 and 4 have their hubs or bosses 7 and 11 made fast to the arbors 8 and 12 respectively by welding, soldering or otherwise. The dial 1 with its hands and coils is mounted in a casing 15, having a base 16 and a glass cover 17 over the front thereof.

Thus the hand 3 always points to the degree of temperature and the hand 4 shows the percentage or degree of humidity by means of the familiar numbers on the scale common to both members 3 and 4. The simplicity and advantage of the combination are thus fully established.

Finally a third pointer or index member 18 is attached to the instrument to register the mean of the numbers at the ends of the members 3 and 4 at any moment. When this member is rotated by hand to a position midway of the members 3 and 4, and checked to agree with the mean of said numbers, the final indication is arrived at. This member 18 has a hub 19 mounted on a stud or journal 20 in the glass 17 covering the members 3 and 4, and projecting from the outer face of said glass. This stud is in line with the axes of rotation of the members 3 and 4 and can be turned by hand to take its proper position.

The final indication can be shown by operation of the member 18 by hand at regular intervals during the day, and if a number of such instruments are used at separated points, mechanical or electrical connections can be utilized to set all the members 18 at selected moments.

The stud 20 is mounted in a bearing ring 21 secured in the glass 17, and faced with washers 22. The inner end of the stud has a head or flange 23 and a coiled spring 24 encircles the stud between the head 23 and adjacent washer 22. The hub or knob 19 is bound on the outer end of the stud by a small screw 25. Hence the index member 18 will be held in adjusted position.

Figure 8:
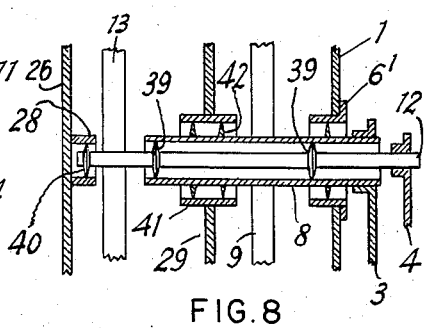
Figure 8 is a detail showing the preferred mounting of the principal parts of said embodiment.

In Figures 5 to 8 inclusive the instrument is designed so that the third member 18' automatically takes its true position midway between the members 3 and 4. The casing 15 has a rear closure 26, and within the casing adjacent the closure 26 is a transverse bar 27 carrying a bearing 28 for the adjacent end of the shaft 12. The members 3 and 4 are mounted on the enveloping sleeve 8 and spindle 12 respectively, as above set forth, and the sleeve and spindle are rotatably supported near the members 3 and 4 in a bearing 6' at the center of the fixed scale plate 1. The coil 9 controls the sleeve 8 and pointer 3; and between the coil 13 for the pointer 4 and the coil 9 is a rotatable plate or element 29 supported on the sleeve 8. This plate has alined radial slots 30.

Affixed at its midpoint to the sleeve 8 just back of the plate 29 is an arm 31; and between this arm and the coil 13 is another arm 32, fixed at its midpoint to the spindle 12. These arms or members are equal in length to each other and parallel to the members 3 and 4, respectively, and therefore are respectively at all times in the same angular positions as the members 3 and 4.

The adjacent ends of the arms 31 and 32 are each movably connected to one end of a link 33 by a pivot pin or rivet 34 and each pair of links at the opposite ends of the arms 31 and 32 are pivotally united at their other ends by a pivot pin or rivet 35 which projects into the adjacent slot 30 of the plate 29. The links or connecting elements 33 are all of equal lengths and each pair forms with the adjacent halves of the arms 31 and 32 a quadrilateral with the sides meeting at the axes of the shaft 8 equal and other sides delineated by the two links 33 equal. Hence the diagonal of each quadrilateral extending from said axes to the outer corner at the pivot pin 35 will always extend along the adjacent slot 31; and this diagonal for all angular positions of the arms 31 and 32 and of the links adjacent each slot, will bisect the angle between the pairs of links, and the opposite angles indicated at 36 between the arms 31 and 32.

Hence, movement of one member 3 or 4 will cause movement of the arm 31 or 32 and the link attached to said arm will pull on the stud or pivot 35 at the outer end of said link. The circumferential component of this pull will rotate the plate 29 and the index member 18' affixed to the plate will infallibly take and keep a position midway between the members 3 and 4 and give the mean reading on the scale 1. The member 18 has the form of a bent strip affixed to the rotatable plate 29, at the edge thereof, and bent over the edge of the fixed dial plate 1 at the right point of the scale 2.

The pins or rivets 34 and 34' must connect the arms 31 and 32 and links 33 loosely enough to allow the links free movement as above described, and the coils 9 and 13 will be heavy enough to ensure accurate operation of the plate 29 and index member 18'. The plate 1 is affixed to the casing 1 by bent brackets 37, separated by spaces 38 from the plate 1 long enough to give clearance to the member 18'.

To eliminate friction, the spindle 12 may carry knife-edge washers 39 to engage the inside of the sleeve 8 and a similar washer 40 in the hub 28. The rotatable plate 29 has a hub 41 surrounding the sleeve 8, which has knife-edge washers 42 in said hub, and the sleeve may also carry another knife-edge washer inside the bearing 6'. The spindle 12 may be similarly mounted in the sleeve 8 and the latter in the bearing 6 in the form shown on Figures 1, 2, 3 and 4.

The pivot pins 35 may have heads 43 on their outer ends to hold the plate 30 against axial movement on the sleeve 8.

In the form shown in Figure 9 the member 18" has the form of an arm, which is of course mounted to move about the same axis as the index members 3 and 4. This member 18" has the slot 30, and two links of equal size 33 are connected at one end to a pivot stud in the slot 30, and at the other end each to a pivot stud which is rigid with respect to an index member 3 or 4 and at some distance from the axis of rotation.

Figure 9 illustrates a simpler way of operating the additional index member by connections with the members 3 and 4. The third index member 18" can be rotatably mounted on the spindle 12 or sleeve 8 between the members 3 and 4, and be made long enough to project beyond the scale graduations on the plate 1. This member has a longitudinal slot 30a. Slidably engaging this slot is a pin 35" pivotally joining the ends of a pair of links 33a. Each link is pivotally connected to one of the members 3 or 4 at points equi-distant from the axis about which these members turn. As the members 3 and 4 move towards each other or apart, the links 33a operate the member 18" and keep it in mid-position with respect to the members 3 and 4. The mean of the numbers representing temperature and humidity can be read through the slot 30 in the member 18".

The pin 35" could be disposed near the inner end of the slot 30, so that the arms 33a would diverge in the opposite direction, and thus the arrangement could be more compact.

Having described my invention, what I believe to be new is:

1. An instrument comprising a stationary dial plate bearing a scale having graduations on its face and numbers adjacent said graduations, a group of three index members adjacent said plate and having a common axis about which each of said members is rotatable, said graduations being arranged to cooperate with each of said members, means for actuating two of said members each independently and each in response to different atmospheric conditions, the third member having a radial slot, and connections between the third member and said two members to cause the third member always to assume a position midway between said two members, said connections comprising a stud slidably engaging said slot, and a plurality of links, one link connecting said stud to one of said two members, and another link connecting said stud and the other of said two members, the connections being such as to permit the links to pivot with respect to each other and with respect to the said two members.

2. An instrument comprising a stationary dial plate bearing a scale having graduations on its face and numbers adjacent said graduations, a pair of index members adjacent said plate, means for mounting said members to be rotatable about a common axis, means for actuating said members to move each independently about said axis to different positions with respect to said scale, a third member adjacent said plate, means for mounting said third member to be rotatable about the same axis, said third member having a slot radially arranged with respect to said axis, a pivot stud slidably engaged in said slot, each of said pair of index members having a pivot stud fixed thereon intermediate the ends thereof, a link pivoted on the first mentioned pivot stud and the pivot stud on one of said index members, and a second link pivoted on said first mentioned pivot stud and the pivot stud on the other of said members, whereby motions of the said index members are transmitted through said links to said third member.

3. An instrument comprising a single stationary dial bearing a scale having graduations on its face and characters adjacent said graduations, a pair of index members, a pair of rotatable shafts on each of which one of said members is rigidly mounted, separate means connected to each shaft, each of said means being responsive to different atmospheric conditions, to move said shafts and said members to indicate said conditions separately on said dial, a third rotatably mounted member having a portion adjacent said scale, and a radial slot therein, a stud slidably engaged in said slot, a pair of links connected to said stud, so as to be pivotable with respect to each other, and a pair of arms, one arm being pivotally connected to one link and rigidly connected to one shaft, and the other arm being pivotally connected to the other link and rigidly connected to the other shaft, so that movement of either index member and its shaft shifts said third member.

4. An instrument comprising a single stationary dial having graduations on its face and characters adjacent said graduations, a pair of index members, a pair of rotatable shafts on each of which one of said members is rigidly mounted, one of said shafts being tubular and enveloping the other shaft, separate means connected to each shaft, each of said means being responsive to different atmospheric conditions to move said shafts and said members independently to indicate said conditions separately on said dial, a third member rotatably mounted on one of said shafts, said member having a radial slot therein and a portion adjacent said dial plate, a stud slidably engaged in said slot, a pair of arms of equal length and a pair of links of equal length connected to said stud, so as to be pivotable with respect to each other, one arm being pivotally connected to one link and rigidly connected to one shaft, and the other arm being pivotally connected to the other link and rigidly connected to the other shaft, so that movement of either index member and its shaft shifts said third member.

References Cited in the file of this patent
UNITED STATES PATENTS

| | | |
|---|---|---|
| 1,628,137 | Giesler | May 10, 1927 |
| 2,093,767 | Rollefson | Sept. 21, 1937 |
| 2,106,083 | Chappell et al. | Jan. 18, 1938 |
| 2,294,540 | Edwards | Sept. 1, 1942 |

FOREIGN PATENTS

| | | |
|---|---|---|
| 638,902 | Germany | Nov. 25, 1936 |

OTHER REFERENCES

Friez: "Bulletin Hygrothermo" Brochure of Julien P. Friez and Sons, Belfort Observator, Baltimore, Md.